Feb. 20, 1951

W. D. TEAGUE, JR 2,542,167

POSITION CONTROL SERVOMOTOR

Filed Dec. 26, 1947

INVENTOR
WALTER D. TEAGUE, JR.
BY Frederic H. Miller
ATTORNEY

Feb. 20, 1951     W. D. TEAGUE, JR     2,542,167
POSITION CONTROL SERVOMOTOR
Filed Dec. 26, 1947     2 Sheets-Sheet 2
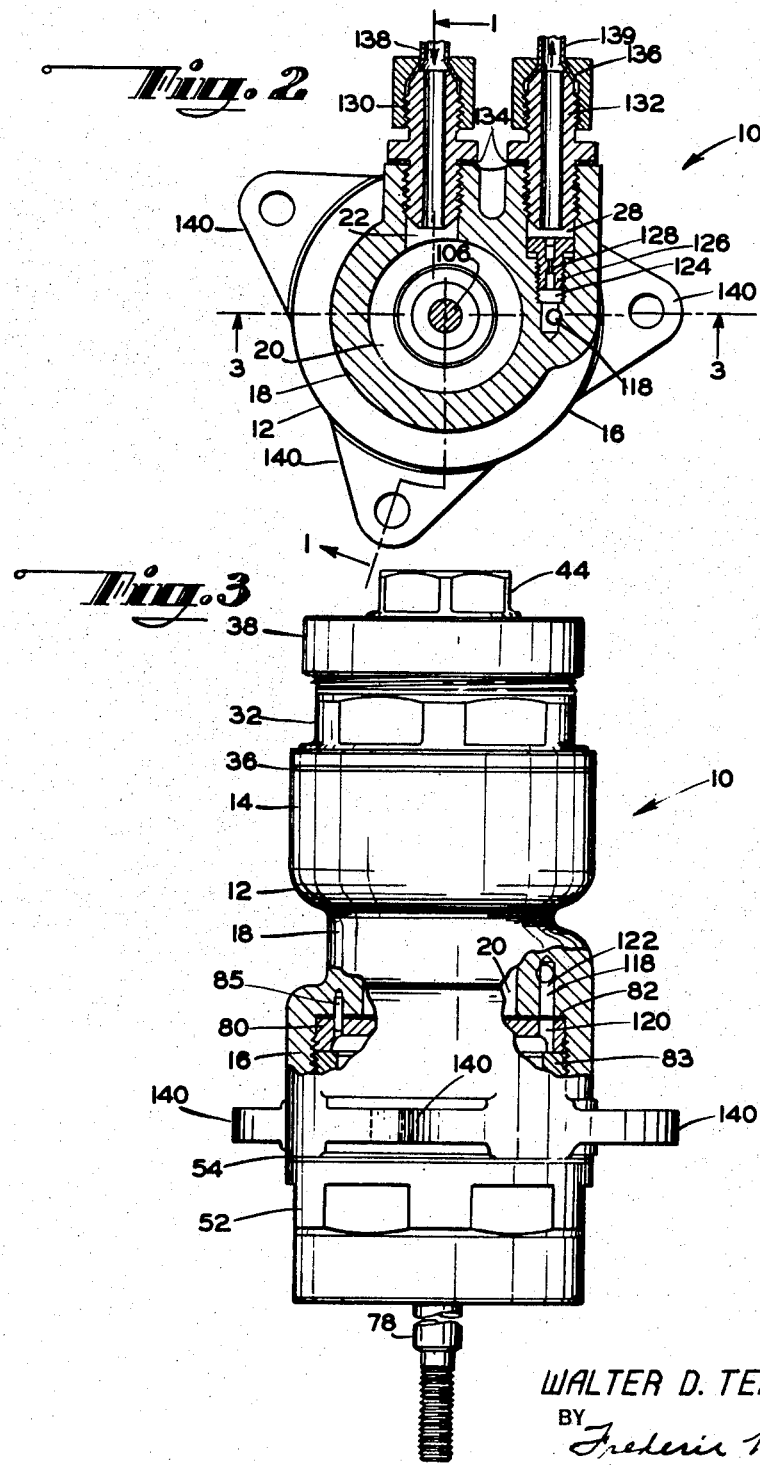
INVENTOR
WALTER D. TEAGUE, JR.
BY Frederic H. Miller
ATTORNEY Patented Feb. 20, 1951

2,542,167

UNITED STATES PATENT OFFICE 2,542,167

POSITION CONTROL SERVOMOTOR

Walter D. Teague, Jr., Alpine, N. J., assignor to Bendix Aviation Corporation, Teterboro, N. J., a corporation of Delaware Application December 26, 1947, Serial No. 793,967

2 Claims. (Cl. 121—38)

1

The invention hereof relates to position control servos, and particularly to devices of this character which are adapted for fluid operation.

An object of the invention is to provide a servo or positioning control unit which shall maintain substantially constant pressure for operating a valve or other device irrespective of altitude variations.

Another object is to minimize acceleration effects as by providing maximum pressure of many times the opposing force of the device to be operated.

Another object is to provide novel sealing means for pressure regulating means to insure sea-level pressure at the side of the means opposite to its regulating pressure side, whereby the pressure regulating means will control to the same absolute pressure at all times.

Another object is to provide a device with rapid action so that, if the system is upset for any reason, lag is minimized in reestablishing equilibrium.

Another object is to provide a device of the above-indicated character which is simple and durable in construction, economical to manufacture, and effective in its operation.

The above and other objects and features of the invention will appear more fully hereinafter from a consideration of the following description taken in connection with the accompanying drawing wherein one embodiment of the invention is illustrated by way of example.

In the drawing:

Figure 2 is a view on a reduced scale taken substantially along the line 2—2 of Fig. 1; and Figure 3 is a view taken partially in side elevation and partially along the line 3—3 of Fig. 2.

Figure 1:
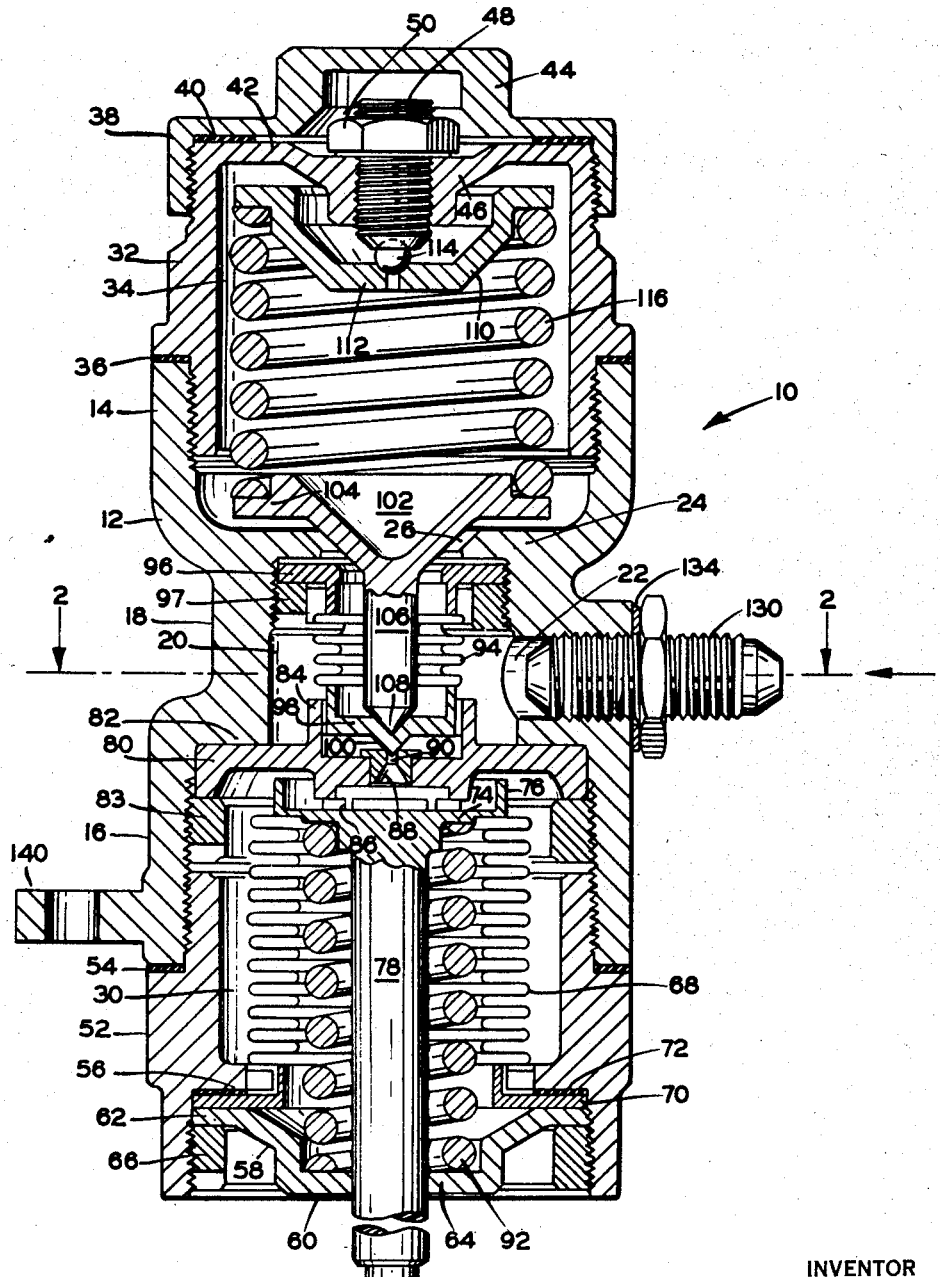
Figure 1 is a view on an enlarged scale, taken substantially along the line 1—1 of Figure 2, of a structure constricted in accordance with the invention.

Referring to the drawing:

The device comprises a housing 10 included, in the normal operative upright position indicated, a body 12 having internally screw threaded upper and lower end portions or lengths 14 and 16, respectively, a constricted mid section 18 defining a bellows-receiving fluid-pressure regulating chamber or space 20, an inlet 22, Figure 2, to the space 20, an upper partition or wall 24 having a through aperture 26, and an outlet 28 from a servo chamber 30.

A housing portion 32, of inverted substantially cup-shape constituting a closure for the end 14 and therewith defining a regulating spring compartment 34, is threaded into the end 14, sealed as by a gasket 36, and adapted for the screw threaded reception of a cap 38 which compresses a gasket 40 against the end wall 42 of the cup portion 32 and has a raised hollow nut portion 44. The wall 42 has an interiorly threaded depressed portion 46 for the reception of a cup point socket screw 48 held by a nut 50.

A sleeve-like portion 52 of the housing 10, threaded into the body 12 against a gasket 54, cooperates with the body to define the chamber 30, and is provided with an inner shoulder 56.

A bottom cover 58 for the sleeve 52 is of shallow substantially cup-shape forming a spring base 60 having an edge margin 62 under the shoulder 56 and an apertured bearing portion 64. A ring nut 66 is threaded into the sleeve 52 below the margin 62.

A fluid-responsive positioning means or bellows 68, of inverted substantially cup-shape and disposed in the chamber 30, has an open-end perimeter 70 sealed, as by a gasket 72, between the shoulder 56 and the margin 62. A disc 74, constituting the closed end of the cup bellows 68, has a top-side upright perimetral flange 76 and an integral depending positioning shaft 78 axially slidably journaled in the bearing 64.

A separate valve plate or partition 80, below the chamber 30 held against a shoulder 82 of the mid section 18, as by a ring nut 83, and positioned angularly, as by a pin or pins 85, Figure 3, has, in this instance, an annular top guide 84, and underside or bottom abutment means 86 within the flange 76, and is provided with a valve seat inset 88 having a regulating orifice 90 through the plate from the space 20 to the chamber 30. A spring 92, around the shaft 78 in the bellows 68 is maintained under compression between the base 60 of the cover 58 and the disc 74 against the abutment 86.

An upright regulating bellows 94, of substantially cup-shape in the space 20, includes an open end rim 96 held around the aperture 26 in the wall 24, as by a ring nut 97, and has a closed end 98 guided in the top guide means 84 and carrying a valve element 100 for controlling the regulating orifice 90. The valve element 100, in this case, constitutes a substantially V-section of the closed end 98 constituted as the valve at its lower side and as a socket at its upper side.

An annular element 102, of substantially V-section extending through the aperture 26, includes an upper spring seat 104 in, and near the bottom of, the compartment 34, and a depending leg 106 in the regulating bellows 94 having a lower end 108 in, and complemental to, the upper side socket of the V-section valve 100.

An upper spring seat 110, of substantially cup-shape, in the compartment 34, surrounds the screw 48 and has an apertured bottom seat 112 for a single-ball bearing 114 which is seated at the top by the lower or cup end of the screw 48. A spring 116 is disposed under compression between the seats 104 and 110.

As better seen in Figure 3, an outlet duct 118 from the chamber 30 to the outlet 28 has portions 120 and 122 in series in the plate 80 and the body 12, respectively, and a portion 124 threaded to receive an inset plug 126 having a bleed orifice 128 of smaller diameter or bore than the regulating orifice 90. Unions 130 and 132, in the inlet 22 and the outlet 28, respectively, against sealing gaskets 134, are adapted to receive the ends 136 of tubes 138 and 139 constituting parts of a fluid circuit system in which the servo unit of the invention is adapted to operate, and apertured lugs 140 are provided for mounting the nut on a support.

The tube 138 is connected to apparatus in which pressure is to be regulated, and the tube 139 communicates with a region of low pressure such as a pump inlet or an overboard outlet.

In operation, the pressure regulating bellows spring 116 is adjusted so that the regulating bellows 94 will raise the valve 100 off its seat 88 at a predetermined liquid discharge pressure at the inlet 22, in this instance of about 425 p. s. i. gage. If the liquid pressure rises too high, the regulating bellows 94 further opens the regulating orifice 90 to admit more high pressure liquid to the servo chamber 30. Since the outlet bleed orifice 128 is considerably smaller than the regulating orifice 90, pressure builds up in the servo chamber 30, compressing or contracting the positioning bellows 68 and its spring 92, to extend the shaft 78 from its retracted positions shown, which action is transmitted to apparatus for effecting a decrease in pressure of the fluid being controlled so that this pressure drops to a preset value.

When the system is satisfied, and in equilibrium, the regulating bellows 94 maintains the valve 100 in position partially throttling the regulating orifice 90.

In case the discharge pressure drops below the preset value, the regulating bellows 94 moves the valve 100 to further close the orifice 90 and cuts down the flow of high pressure liquid into the servo chamber or space 30.

As the liquid drains through the fixed bleed orifice 128 to the low pressure outlet 28, the pressure in the servo chamber 30 is decreased and allows the positioning spring 92 to extend the bellows 68 to retract the shaft 78. This action serves to increase the fluid pressure to its preset value. As soon as equilibrium is again established, the regulating bellows 94 causes the valve 100 to resume a position partially throttling the regulating orifice 90, in which the action is so rapid that little lag occurs in reestablishing equilibrium when the system is upset for any reason.

Although only one embodiment of the invention has been illustrated and described, various changes in the form and relative arrangements of the parts may be made to suit requirements.

What is claimed is:

1. In combination in a position-control servo, a housing comprising, in one position, upper and lower body end portions and a constricted mid section defining a space, an inlet to the space, an apertured upper wall of said space and an outlet from a chamber; an inverted closure cup threaded and sealed in said upper end and therewith defining a compartment, a cap threaded and sealed over the cup, a sleeve threaded and sealed in said lower end to form said chamber and having an inner shoulder, a bottom cover for the sleeve forming a spring base having an edge margin under the shoulder and a bearing, and a ring nut below said margin; an inverted cup positioning bellows in said chamber having an open-end perimeter sealed between the shoulder and the margin and a closed end disc having a top upright perimetral flange and an integral depending shaft journaled through said bearing; a plate below said chamber having a top guide, a bottom abutment within said flange, and an inset having a regulating orifice through the plate; a ring nut holding the plate against the mid section; a spring around the shaft in compression between the base and the disc against the abutment, a regulating bellows of upright cup-shape in said space including an open-end rim and having a closed end in the guide carrying a valve for said regulating orifice, a ring nut holding the rim against said wall, an element of Y-section through the aperture of said wall having a top spring seat in said compartment and a depending leg in said regulating bellows against said valve, a screw through the closed end of the closure cup, a cup spring seat surrounding the screw, a single-ball bearing between the screw and the cup seat, a spring in compression between the seats, said body and plate forming a duct from the chamber to the outlet, and an inset plug in the body having a bleed orifice in the duct of smaller diameter than the first orifice.

2. In combination in a position-control servo, a housing comprising, in one position, upper and lower body end portions and a mid section defining a space, an inlet to the space, an apertured upper wall of said space and an orifice from the space to a chamber; means in said upper end and defining with said upper end a compartment, means sealed in said lower end to form said chamber and a spring base and bearing, a positioning bellows in said chamber having a depending shaft journaled through said bearing, a spring around the shaft in compression between the base and the bellows, a regulating bellows in said space and carrying a valve for regulating said orifice, an element through the aperture of said wall having a spring seat in said compartment and a depending leg in said regulating bellows against said valve, a second spring seat in said compartment, a spring in compression between the seats, and a bleed orifice from the chamber to an outlet of smaller diameter than the first mentioned orifice.

WALTER D. TEAGUE, Jr.

REFERENCES CITED

The following references are of record in the file of this patent:

UNITED STATES PATENTS

| Number | Name | Date |
|---|---|---|
| 738,161 | Christensen | Sept. 8, 1903 |
| 962,551 | Conrader | June 28, 1910 |
| 1,156,165 | McManamy | Oct. 12, 1915 |
| 2,193,075 | Osborne | Mar. 12, 1940 |